United States Patent [19]

Takahashi

[11] Patent Number: 5,392,231

[45] Date of Patent: Feb. 21, 1995

[54] WAVEFORM PREDICTION METHOD FOR ACOUSTIC SIGNAL AND CODING/DECODING APPARATUS THEREFOR

[75] Inventor: Susumu Takahashi, Tokyo, Japan

[73] Assignee: Victor Company of Japan, Ltd., Yokohama, Japan

[21] Appl. No.: 7,133

[22] Filed: Jan. 21, 1993

[30] Foreign Application Priority Data

Jan. 21, 1992 [JP] Japan .................................. 4-030076

[51] Int. Cl.⁶ .............................................. G06F 7/548
[52] U.S. Cl. ..................................... 364/725; 364/729
[58] Field of Search ............... 364/729, 753, 700, 718, 364/725

[56] References Cited

U.S. PATENT DOCUMENTS 3,981,443  9/1976  Lynch et al.
4,509,150  4/1985  Davis .................................. 364/422
5,089,818  2/1992  Mahieux et al. ..................... 364/485

FOREIGN PATENT DOCUMENTS 0337636  10/1989  European Pat. Off.
3-144700  6/1991  Japan.

OTHER PUBLICATIONS

IEEE Transactions on Acoustics, Speech and Signal Processing, vol. ASSP-31, No. 3, Jun. 1983, pp. 664–677.
ICASSP 81, pp. 213–216.
ICASSP 90, pp. 17–20, IEEE, vol. 1.
Frequenz, vol. 44, Nos. 9/10, Sep.-Oct. 1990, pp. 226–232.
IEEE Journal of Selected Areas in Communications, vol. 6, No. 2, Feb. 1988, pp. 314–323.
Johnson, James D.; "Transform Coding of Audio Signals Using Perceptual Noise Criteria"; IEEE Journal on Selected Areas in Communications, vol. 6, No. 2; Feb. 1988; p. 314.

Primary Examiner—Emanuel T. Voeltz
Assistant Examiner—Craig Steven Miller
Attorney, Agent, or Firm—Jacobson, Price, Holman & Stern

[57] ABSTRACT

By data every a predetermined number of discrete frequencies obtained by implementing orthogonal transform processing to acoustic signal data by using the same window function for first and second frames in sequential frames of an acoustic signal having a predetermined fixed time length, phase information every respective discrete frequencies are obtained every the first and second frames. Then, quantities of changes of phase information every discrete frequencies corresponding to each other in the first and second frames are determined. On the assumption that the quantities of changes of phase information every individual discrete frequencies are fixed on the time base, individual phase information every a predetermined number of discrete frequencies in a frame at a third time position existing at a time position of a multiple of integer of a time difference between the first and second time positions are determined to predict phase information of the frame at the third time position. Thus, it is possible to efficiently encode an acoustic signal to facilitate it to satisfactorily record or transmit it, or to easily provide a sound source for an electronic musical instrument excellent in performance.

6 Claims, 10 Drawing Sheets

WAVEFORM PREDICTION METHOD FOR ACOUSTIC SIGNAL AND CODING/DECODING APPARATUS THEREFOR

BACKGROUND OF THE INVENTION

This invention relates to a technology for corresponding a quantity of information of a digital signal, which is suitable in converting an acoustic signal or any other analog signal to a digital signal to record or transmit such a digital signal.

In recent years, analog signals have been frequently recorded or transmitted as a digital signal, e.g., a pulse code modulation (PCM) signal. Since the PCM signal has many information quantity, a broad transmission band for recording or transmission thereof is required. In view of this, a scheme has been conventionally adopted in recording/reproducing equipments, transmitting equipments or other various equipments for carrying out signal processing of a digital signal to efficiently process digital signals by a lesser quantity of information.

As an efficient coding system capable of efficiently coding signals by a lesser quantity of information, there have been conventionally proposed various systems of the type in which prediction of signals carried out to record or transmit only a component of deviation from a predicted value (residual component), or various systems of the type in which a sort of transform (generally, orthogonal transform) processing is implemented to a signal to extract the feature of that signal to lessen a quantity of information (the number of bits) every respective samples by making use of the property that the feature portion of that signal or the visual sense or the hearing sense of the human being is sensitive to a change at the portion where a change of a signal is small, but is not sensitive at the portion where a signal greatly changes even if there is an error to some extent, or the like.

FIG. 1 is a block diagram showing a well known efficient coding system constructed by applying thereto a linear prediction put into practice for the purpose of compressing a quantity of information in transmitting a speech signal of a telephone. In the efficient compression system shown in FIG. 1, numerator (zero) and denominator (pole) of the predictive system are predicted. However, its prediction ability is not so satisfactory, and is hardly effective in transmission of an acoustic signal. As the efficient coding system by the linear prediction, the Parco system exists in addition to the above-mentioned system, but has a limitation in performance.

As described above, up to the present time where there has been no predicting method suitable for compression of a quantity of information relating to recording or transmission of an acoustic signal, the efficient coding method of the bit compression type has been most widely used for the purpose of compression of a quantity of information relating to recording or transmission of an acoustic signal. In this type, as shown in the time chart of FIG. 2(a), for example, bit compression is carried by making use of the masking effect between nearby frequencies by the orthogonal transform processing. Namely, an approach is employed as shown in FIG. 2 to extract, from an acoustic signal, periods, e.g., having 1024 sampling points as periods of respective sequential frames with their connecting portions slightly overlapping with each other by making use of a window function to carry out orthogonal transform processing by Fast Fourier Transform (FFT) every respective frames.

Then, a frequency value having the largest amplitude is determined from data obtained by the FFT to perform a calculation for determining a masking curve as shown in FIG. 2(c) with the above-mentioned frequency being as a center. On the basis of such a masking curve, a processing is conducted such that a spectrum having an amplitude larger than the masking curve is recorded or transmitted, and a spectrum having an amplitude smaller than the masking curve is not recorded or transmitted. Namely, a processing is conducted such that a corresponding sound is inaudible is not recorded or transmitted. As the orthogonal transform technique, a discrete Fourier transform (DFT) or discrete cosine transform (DCT), etc. may be used.

The reason why data can be reduced as stated above is as follows. Namely, in the case where sound of a certain frequency component is radiated at a high intensity, vicinity of that frequency component is lowered in the hearing sense of the human being. Therefore, there is employed means such that a lesser number of bits are allocated to the frequency component at the portion where the sense ability is lowered, and that signal components of a small amplitude are not transmitted in the least, or other means, thereby making it possible to realize reduction of a quantity of data. While the signal accuracy is lowered to considerable degree by the reduction of a quantity of data as stated above, a measure is frequently taken such that any distinction or difference does not exist between hearing of a signal in which the data quantity is reduced and hearing of an original signal by the masking effect in the hearing sense.

As described above, since prediction of a signal and the orthogonal transform processing of a signal have been independently carried out for carrying out efficient coding in the prior art, sufficiently efficient coding could not be conducted.

SUMMARY OF THE INVENTION

An object of the present invention is to provide a waveform prediction system for an acoustic signal in which both the signal prediction technology and the orthogonal transform technology are reasonably harmonized to predict an orthogonally transformed signal of a subsequent frame from orthogonally transformed data so that a higher efficient coding can be carried out.

In order to attain the above-mentioned object, in accordance with this invention, there is provided a waveform prediction system for an acoustic signal, which is adapted to predict, from a signal waveform of a first frame at a first time position and a signal waveform of a second frame at a second time position in sequential frames extracted from an acoustic signal so that the respective sequential frames have a predetermined fixed time length, a signal waveform of a third frame at a third time position having a time difference relative to the second time position by a multiple of integer of a time difference between the first time position and the second time position, the system comprising: means for implementing orthogonal transform processing to acoustic signal data by using the same window function for the first and second frames; means for converting data with respect to a predetermined number of discrete frequencies of the data obtained from the orthogonal transform means into amplitude data and phase data; means for determining, every discrete frequencies, quantities of changes of the phase data of the first and second frames; means for predicting phase data every discrete frequencies in the third frame on the assumption that quantities of phase data every discrete frequencies are fixed on the time base; means for converting the amplitude data of the second frame and predicted phase data of the third frame to complex number data every discrete frequencies by coordinate transformation; and means for implementing inverse orthogonal transform processing to the complex number data to carry out a predictive processing such that the data thus obtained is considered to be signal waveform data of the third frame.

In the waveform prediction system thus featured, the same window function is used for the first and second respective frames in the respective sequential frames extracted from an acoustic signal so that the respective frames have a predetermined fixed time length to carry out Fourier transform processing in a discrete manner. By data every a predetermined number discrete frequencies determined as the result of Fourier transform processing every the first and second frames, phase information every respective discrete frequencies are obtained every the first and second frames. Then, quantities of changes of phase information every discrete frequencies corresponding to each other in the first and second frames are determined. On the assumption that the quantities of changes of phase information every individual discrete frequencies are fixed on the time base, individual phase information every a predetermined number of discrete frequencies in a frame at the third time position existing at a time position of a multiple of integer of a time difference between the first and second time positions are determined. Thus, phase information in the frame at the third time position is predicted.

Accordingly, in accordance with the present invention, both the orthogonal transform technology and the signal prediction technology are reasonably harmonized, thereby making it easy to reduce a quantity of information to much degree. By application of the method according to this invention, a sound source for an electric musical instrument, which is of a simple construction and has good performance, can be provided.

In addition, since it is easy to efficiently encode an acoustic signal, it becomes easy to satisfactorily carry out recording or transmission of an acoustic signal in which a quantity of data is compressed to much degree.

DETAILED DESCRIPTION OF THE PREFERRED EMBODIMENTS

A preferred embodiment of a waveform prediction system for an acoustic signal of this invention will be described in detailed with reference to the attached drawings.

In this invention, the orthogonal transform technology and the prediction technology are combined to thereby present waveform prediction method for an acoustic signal which has the feature of transform coding (orthogonal transform coding), also has an extremely high signal predictive ability, and can be satisfactorily applied to efficient coding. Initially, sequential first and second frames in subsequent respective frames are extracted from an acoustic signal so that respective frames have a predetermined fixed time length. The same window function is used to implement Fourier transform processing to those frames in a discrete manner. By respective data every a predetermined number of discrete frequencies determined as the result of the Fourier transform processing, phase information every respective discrete frequencies are provided every first and second frames mentioned above. Then, quantities of changes of phase information every the same discrete frequencies in those frames are determined. On the assumption that the quantities of changes are fixed on the time base, individual phase information of a predetermined number of disrete frequencies in a frame at a third time position existing at a time position of a multiple of integer of a time difference between first and second time positions are determined, thus to predict phase information of the Fourier transform frame at the third time position.

Figure 1:
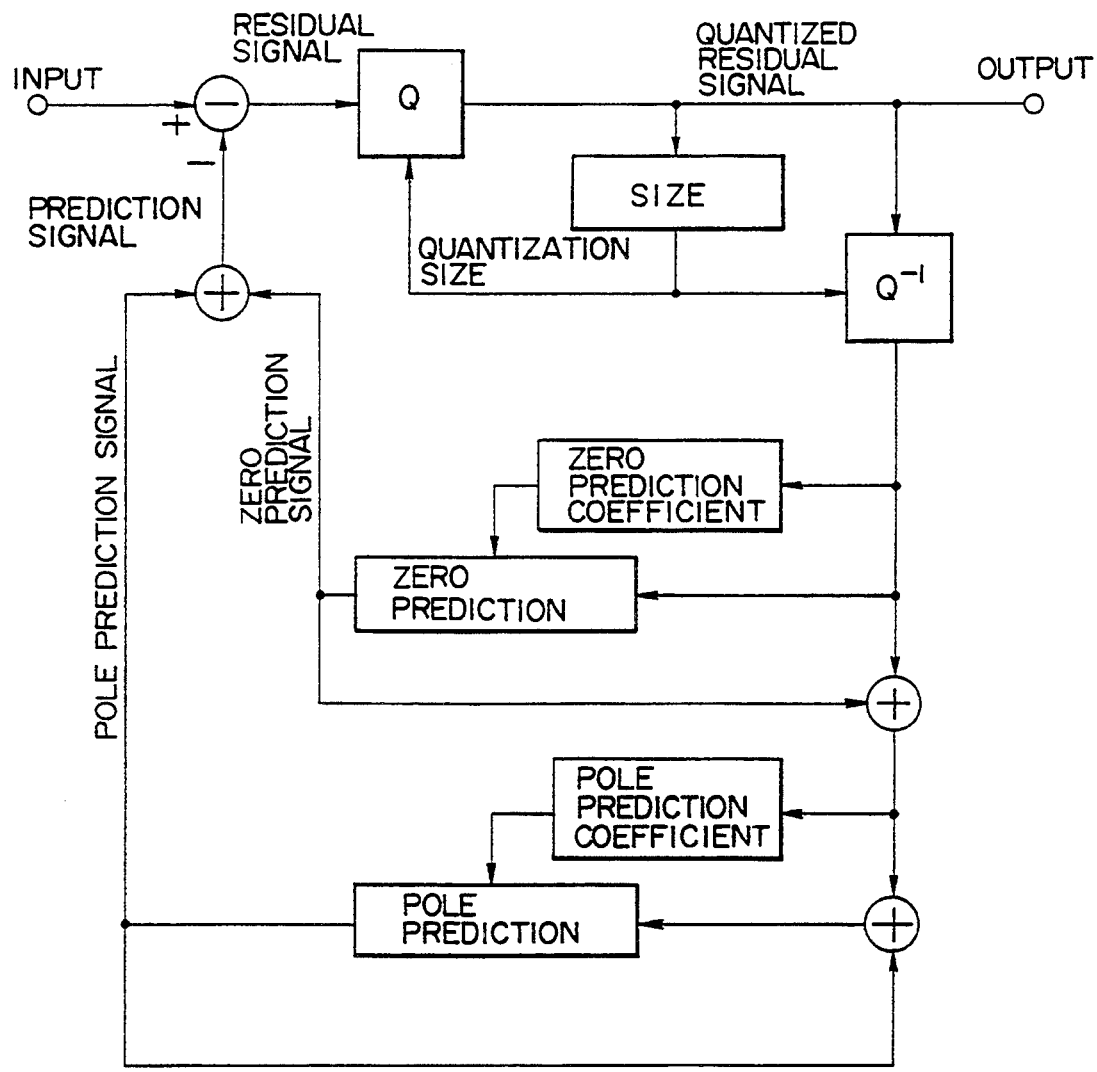
FIG. 1 is a block diagram showing a well known efficient coding system constructed by applying the linear prediction thereto.
Figure 2A:
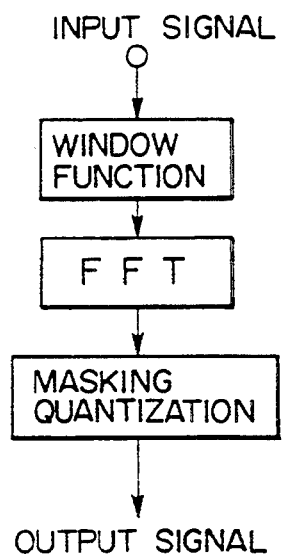
FIGS. 2(a), 2(b), and 2(c) are explanatory views in the case where bit compression is carried out by making use of the masking effect between nearby frequencies by the orthogonal transform processing.
Figure 2B:
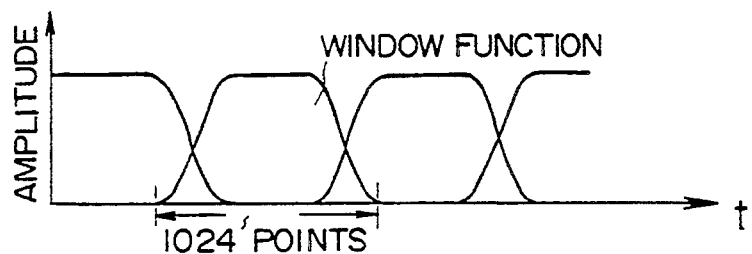
Figure 2C:
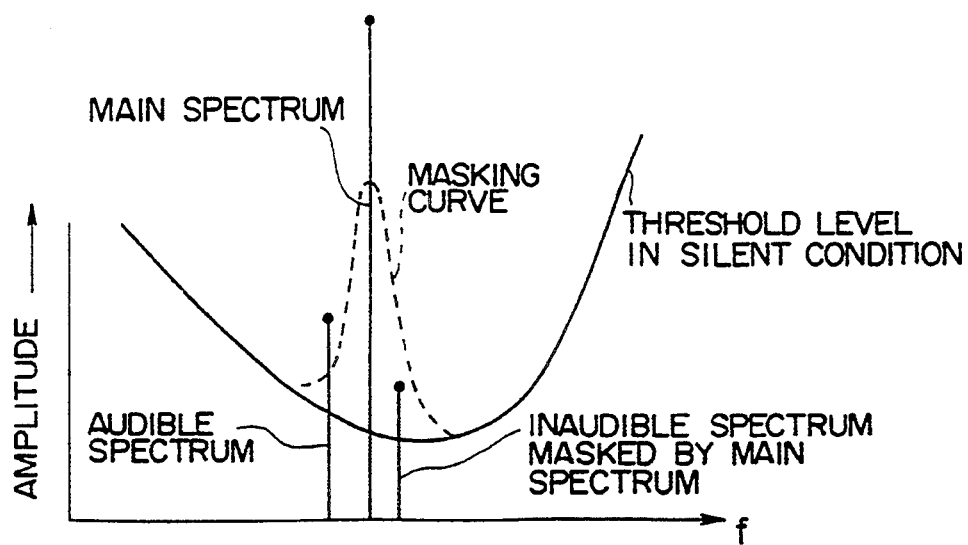
Figure 3A:
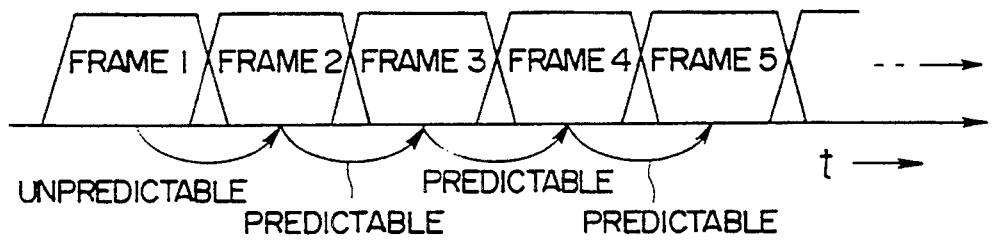
FIGS. 3(a), 3(b), and 3(c) are views for explaining the outline of a phase prediction method for an acoustic signal of this invention.
Figure 3B:
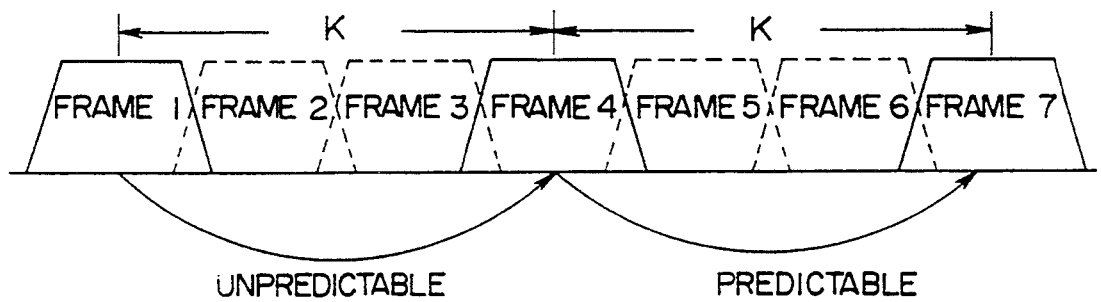

In FIG. 3(a) and 3(b), frame 1, frame 2, . . . , are sequential frames extracted from an acoustic signal so that they have fixed time length. Respective frames are extracted from the acoustic signal as sequential frames with their connecting portions slightly overlapping with each other by using a window function so that the respective frames have a time period having 1024 sampling points, for example. To the respective frames, orthogonal transform processing is implemented, e.g., by a discrete Fourier transform (DFT) or fast Fourier transform (FFT) of finite series. The following embodiment will be described by taking an example where the above-mentioned orthogonal transform processing is carried out by the Fast Fourier transform (FFT) processing.

In the case where FFT operation is performed with respect to respective frames, when it is assumed that the number of data (the number of samples) in the respective frames and the sampling frequency are represented by N and fs, a FFT operation result with respect to discrete respective frequencies (N frequencies in total)

every frequency interval of f expressed as "f=fs/N" is obtained. This FFT operation result is comprised of a real part (Real) amplitude and an imaginary (Imag) amplitude every respective discrete frequencies.

Assuming now that an input is given to the real part of FFT and no input is given to the imaginary part thereof, the operation result with respect to the frequency from fs/N up to (N/2−1)×(fs/N) and the operation result with respect to the frequency from (N−1)×(fs/N) up to (N/2+1)×(fs/N) of the FFT operation result with respect to the N discrete frequencies are complex conjugate, and the operation result of the latter part is unnecessary.

In view of this, with respect to (N/2+1) discrete frequencies from 0 up to (N/2)×(fs/N), the real part (Real) amplitude and the imaginary part (Imag) amplitude are used to perform polar coordinate transformation in accordance with the following formulas (1) and (2), thus to determine a synthetic amplitude term (Amp) and a phase term (Phase):

$$\text{Amp} = \sqrt{(\text{Real})^2 + (\text{Imag})^2} \quad (1)$$

$$\text{Phase} = \tan^{-1}(\text{Imag}/\text{Real}) \quad (2)$$

In the case where the synthetic amplitude term (Amp) and the phase term (Phase) are determined by the polar coordinate transformation every respective discrete frequencies in accordance with the above-mentioned formulas (1) and (2) by using the real part (Real) amplitude and the imaginary part (Imag) amplitude every respective discrete frequencies with respect to sequential frames successive on the time base, it is natural that if a most sensible way of thinking is taken, it is foreseen that two frames adjacent on the time base would be the same spectrum.

It is a manner of course that the synthetic amplitude term and the phase term mentioned above may be determined by any method except for the method of determining them by using the formulas (1) and (2). For example, in the case where no input is given to the real part, other various methods may be adopted of course as in a method of determining the phase term only by using the real part.

Figure 8:
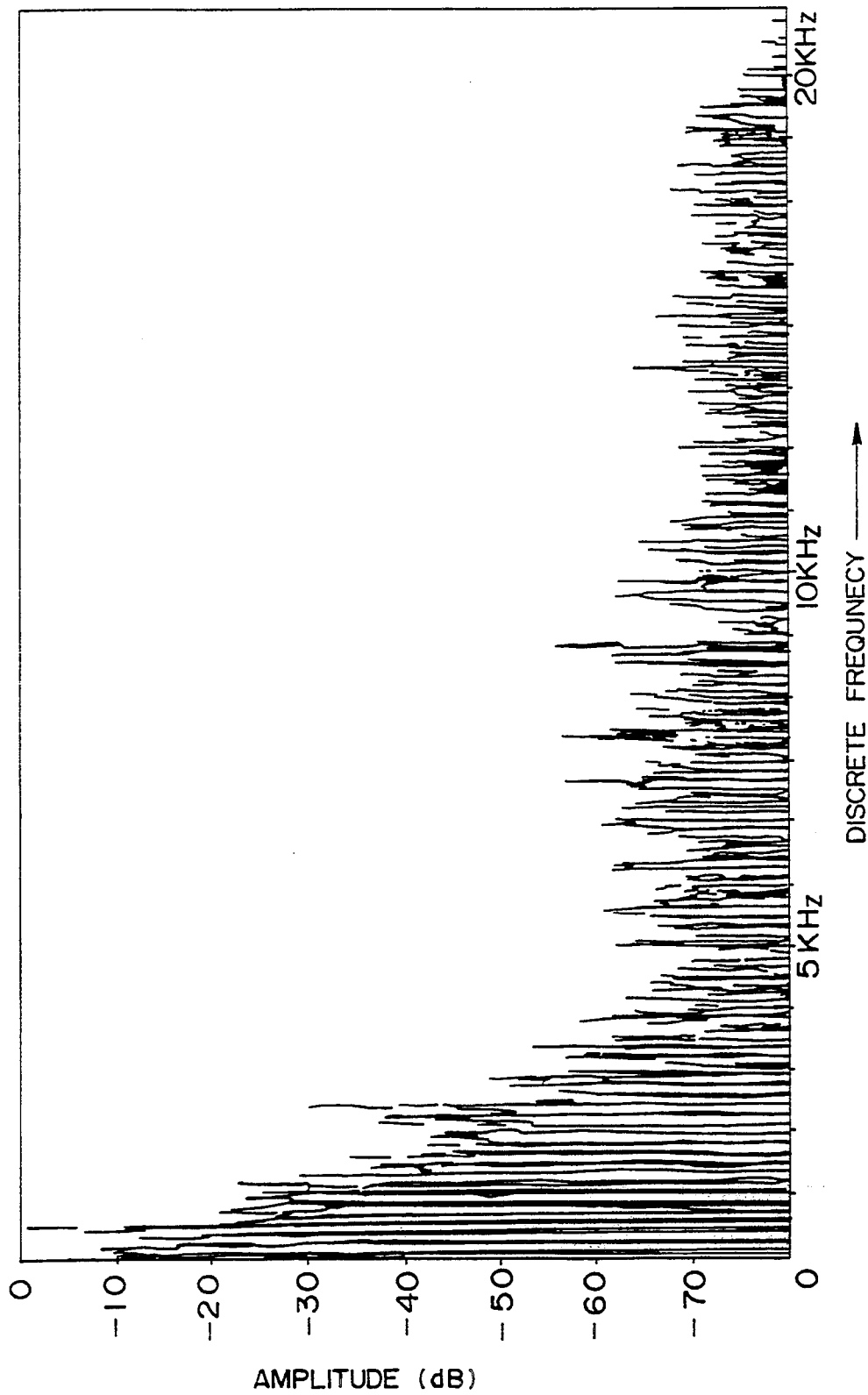

FIG. 8 shows, as an actual example, a spectrum by a FFT operation result obtained in the case where a FFT is performed with respect to acoustic signal of a piano on the assumption that the sampling frequency is 44.1 KHz and the frame has a length corresponding to 1024 sampling points. In FIG. 8, with respect to 512 spectra in a certain one frame, a quantity of a change is extremely small both with respect to 512 spectra in a frame subsequent to the above-mentioned frame and with respect to 512 spectra in a frame subsequent to the last-mentioned frame. Namely, the above-mentioned frame length is about 1/40 seconds, and a quantity of a change of sound spectrum during that period is extremely small.

Figure 9:
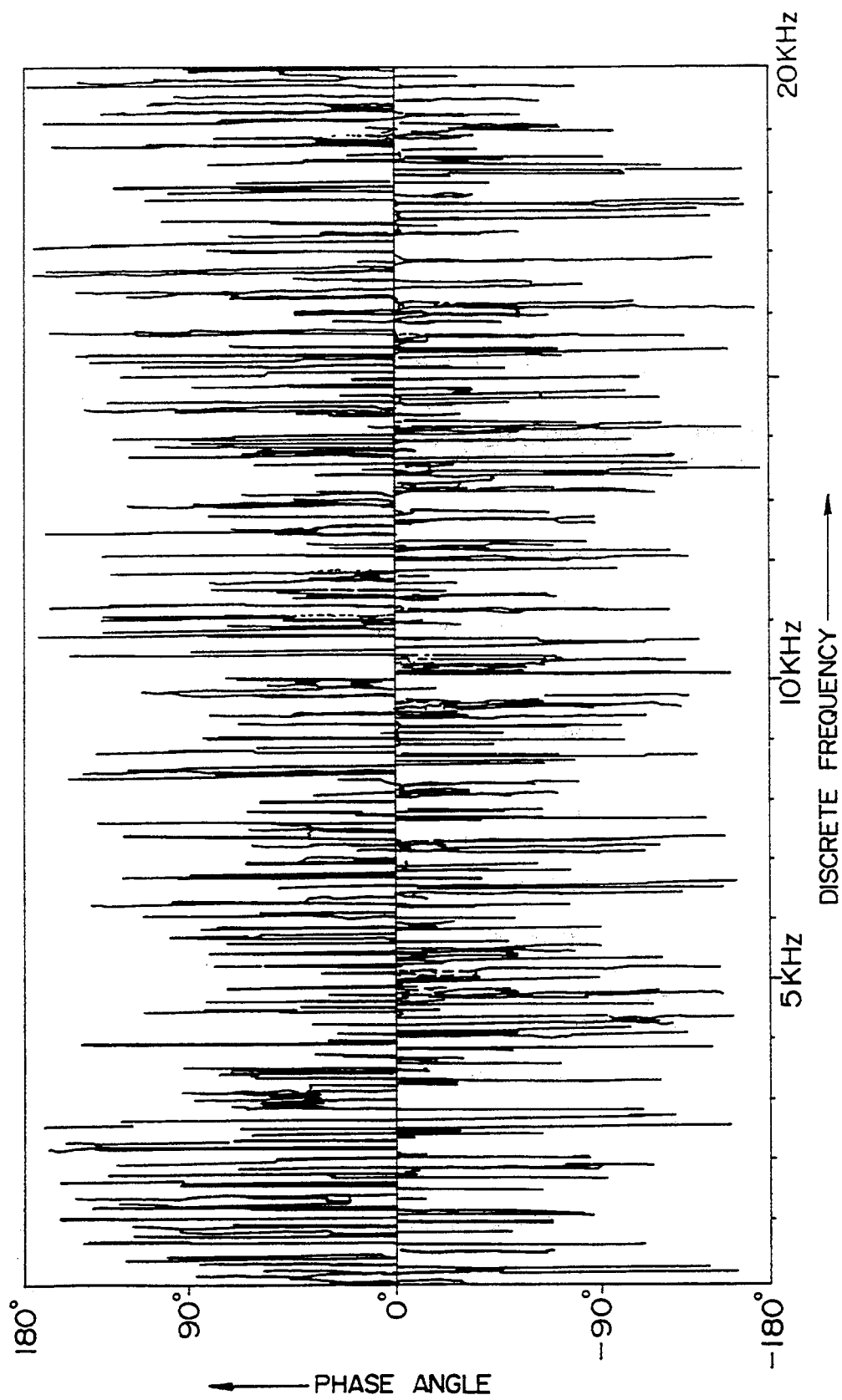
FIG. 9 is a view showing the relationship between discrete frequencies and a phase angle.

On the other hand, from the fact that the repetition time of sequential frames and the frequency of a signal are irrelevant to each other and the fact the frame begins and ends irrespective of the phase of a signal, it is clear that prediction of phase in sequential frames successive on the time base is difficult. For this reason, it has been conventionally considered that signal prediction by the orthogonal transform processing is difficult. FIG. 9 shows, as an actual example, a distribution of phase in a FFT operation result obtained in the case where a FFT operation is performed with respect to an acoustic signal of a piano on the assumption that the sampling frequency is 44.1 KHz and the frame has a length corresponding to 1024 sampling points. In FIG. 9, since a phase distribution of 512 spectra in a certain one frame is at random, it is impossible to predict a phase distribution of 512 spectra in the subsequent frame.

The inventor has paid attention to the fact that if the quantities of changes of phase information between phase information every a predetermined number of discrete frequencies obtained as the result of the Fourier Transform processing every respective frames with respect to two frames have a fixed relationship on the time base, it will be possible to predict phase information of other frames by using the above-mentioned relationship. On the basis of this point of view, we have adopted the hypothesis that "the quantities of changes of phase information between phase information every a predetermined number of discrete frequencies obtained as the result of Fourier transform processing every respective frames are fixed on the time base". We actually conducted an experiment by using various signals such as a sine wave signal of a signal frequency, a synthetic signal of sine wave signals of a plurality of frequencies, an acoustic signal of musical instrument (piano), etc. As a result, since it was considered that the phase of frame predicted in accordance with the above-mentioned hypothesis and the phase of an actual frame are in correspondence with each other at the level of a practical use, it was confirmed that this hypothesis is correct.

The reason why our hypothesis is correct, will now be verified with respect to FIG. 3, etc. Namely, as shown in FIGS. 3(a) and 3(b), frames 1, 2, . . . , are extracted from an acoustic signal as sequential frames with the connecting portion slightly overlapping with each other by using a window function so that these frames have a period (fixed time length), e.g., having N sampling points. These respective frames undergo fast Fourier transform (FFT). Thus, FFT operation results each comprised of a real part (Real) amplitude and an imaginary part (Imag) amplitude every discrete N frequencies having fixed frequency interval f every respective frames. When it is assumed that the sampling number of data in the frames every respective frames and the sampling frequency are respectively represented by N and fs, the above-mentioned frequency interval f is expressed as "f=Fs/N".

However, data relating to N/2 discrete frequencies higher than (N/2+1)×fs/N of the obtained FFT operation results is unnecessary as previously described, so such data is not utilized. Respective real part (Real) amplitudes and imaginary part (Imag) amplitudes of (N/2+1) valid discrete frequencies from 0 up to "(N/2)×(fs/N)" are used to determine a synthesis amplitude term (Amp) and a phase term (Phase) by the polar coordinate transformation with respect to sequential frames in accordance with the above-mentioned formulas (1) and (2).

Figure 3C:
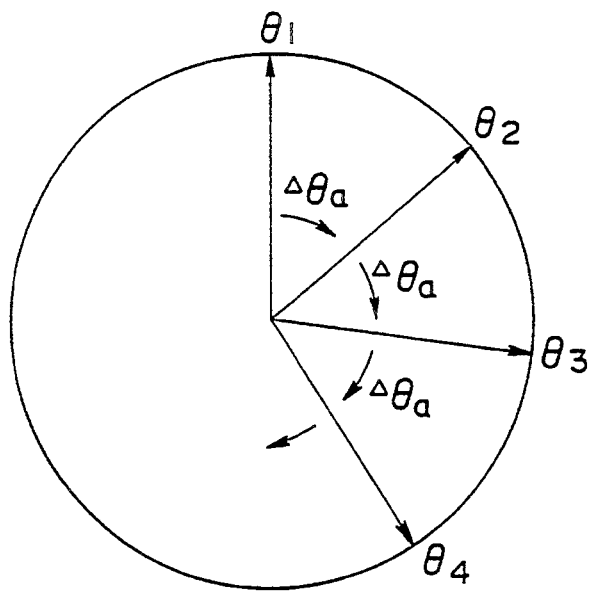

Meanwhile, since the previously described our hypothesis is that quantities of changes of phase between frames are substantially fixed, when it is assumed that N/2 data of the phase term in the frames 1 to 4 shown in FIG. 3(a) are respectively represented by $\theta_1$ to $\theta_4$ in FIG. 3(c), phase change quantities expressed as "$\theta_2 - \theta_1 \approx \theta_3 - \theta_2 \approx \theta_4 - \theta_3 \approx \Delta\theta_a$" are obtained by our hypothesis. Accordingly, on the premise that this hypothesis holds, if a difference between N/2 data of the phase term with respect to successive two frames is determined, data difference between all other successive two frames will be determined. Thus, phase prediction of other frames can be made.

In a more practical sense, the hypothesis by the inventor is stated below. Namely, in the case where data of the phase term of the specific frequency value fa in the frame 1 is $\theta_1$ and data of the phase term of the specific frequency value fa in the frame 2 is $\theta_2$ as in the above-described example, data $\theta_3$ of the phase term of a specific frequency value fa in a frame subsequent to the frame 2 is predicted in accordance with the following formula;

$$\theta_3 \approx \theta_2 + (\theta_2 - \theta_1) \approx 2\theta_2 - \theta_1 \qquad (3)$$

Such predictions are individually carried out with respect to all respective discrete frequencies in the frames 1 and 2, thereby making it possible to carry out phase prediction of signal of the frame 3.

In accordance with the above-mentioned hypothesis by the inventor, as shown in the frame train in FIGS. 3(a) and 3(b), even if phase information of one frame, e.g., phase information of only the frame 1 is known, it is impossible to predict phase information of other frames by using that phase information, but if phase information of two frames are known, it is possible to predict phase information of other frames.

Namely, FIG. 3(a) shows that if phase information of adjacent two frames, e.g., phase information of the frame 1 and phase information of the frame 2 are known, prediction of phase information of other frames except for the above-mentioned two frames can be made by the previously described hypothesis by the inventor. Furthermore, FIG. 3(b) shows that if phase information of two frames having a time difference therebetween by a time length K times greater than the time length of one frame, e.g., phase information of the frame 1 and phase information of the frame 4 are known, prediction of phase information of other frame having a time difference relative to the frame 4 by a time length K times greater than the time length of one frame, e.g., phase information of the frame 7 can be made by the previously described hypothesis by the inventors.

It is to be noted that the case where prediction of phase information of frames different from the above-mentioned two frames can be made by the hypothesis by the inventors when it is assumed that phase information of two frames are known, is not limited to the actual example as shown in FIGS. 3(a) and 3(b). The generalized representation of our hypothesis is summarized as a waveform prediction method for an acoustic signal, comprising the steps of: implementing Fourier transform processing to acoustic signal data in a discrete manner by using the same window function for first and second frames in respective sequential frames extracted from an acoustic signal so that the respective frames have a predetermined fixed time length; obtaining phase information per respective discrete frequencies every the first and second frames by data every a predetermined number of discrete frequencies obtained as the result of the Fourier transform processing every the first and second frames; determining quantities of changes of phase data every frequencies corresponding to each other in the first and second frames; determining individual phase information of the predetermined number of discrete frequencies in a frame at a third time position existing at a time position of a multiple of a time difference between first and second time positions; thus to predict phase information of the frame at the third time position. Thus, in the prediction of an acoustic signal carried out by using a phase prediction method for an acoustic signal, it is possible to carry out prediction of a present or future acoustic signal by using past data of an acoustic signal, or to carry out prediction of a past data or future acoustic signal by using present data of an acoustic signal.

Figure 7A:
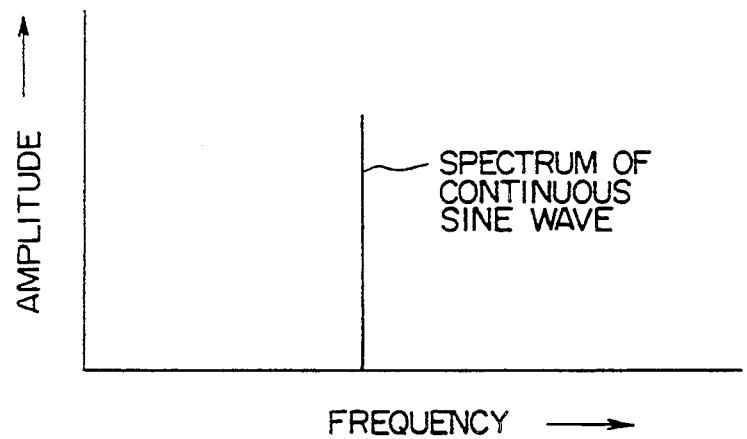
FIGS. 7(a), 7(b), and 8 are frequency spectrum diagrams.
Figure 7B:
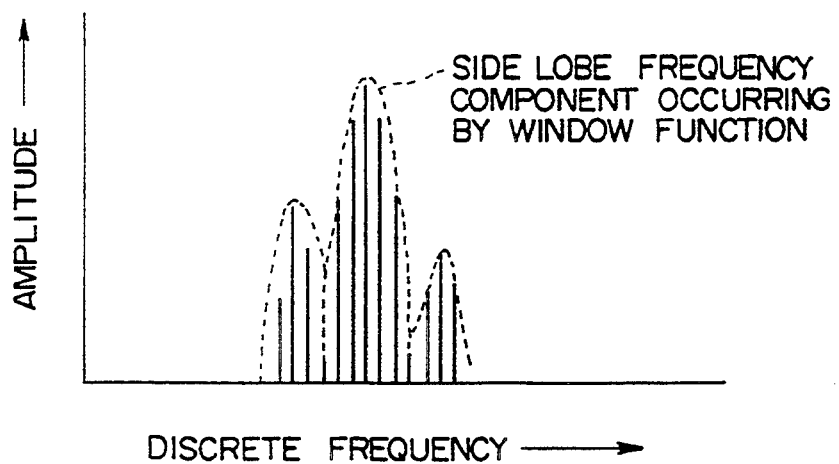

Meanwhile, FIG. 7(a) shows a sine wave signal of a single frequency such that a spectrum as shown takes place, and FIG. 7(b) shows side lobe frequency components occurring by a window function. On the other hand, there is no means for mathematically verifying whether or not prediction can be approximated by the above-mentioned formula (3) with respect to the frequencies of side lobe. As the result of the fact that computer simulation is conducted in connection with the case where a signal of a single frequency is separated into components by applying a window function thereto, it has been confirmed that phase differences (changes in phase) of the side lobe slightly change every frame.

Furthermore, in accordance with the principle of the fast Fourier transform (FFT), because of the fact that the contents of sequential frames successive on the time base are assumed to be the same, and that respective discrete frequencies exist every period of integer in the Fourier transformation, in the case where phases of the respective discrete frequencies are not the same, the waveform themselves of respective frequencies will be in a discontinuous state between frames as a matter of course. When these facts are taken into consideration, the above-mentioned hypothesis might be deemed to be a considerably unreasonable theory.

However, as the result of the fact that various signals such as a sine wave signal of a single frequency, a synthetic signal of sine wave signals of a plurality of frequencies, or an acoustic signal of a musical instrument (piano), etc. are actually used to conduct an experiment in accordance with the hypothesis of the inventor, prediction could be satisfactorily conducted with respect to the sine wave signal of a single frequency and the synthetic signal of sine wave signals of the plurality of frequencies, etc. In addition, also with respect to the acoustic signal of a musical instrument (piano), as taught by the experimental result shown in FIG. 10, a correct predicted result was obtained to such an extent that the phase (thick line) of a frame predicted in accordance with the hypothesis and the phase (thin line) of an actual frame are considered to be in correspondence with each other at the level of a practical use. Accordingly, it was verified by various experimental results that the hypothesis by the inventor is effective for practical use.

Namely, the waveform prediction method for an acoustic signal of this invention utilizes the fact that even if amplitudes or phases differ from each other every frame, or waveforms with respect to individual discrete frequencies are discontinuous, those waveforms are continuous in an inverse FFT signal (synthesized signal).

In the waveform prediction method for an acoustic signal of this invention constructed in accordance with the hypothesis by the inventors, an approach is employed to implement Fourier transform processing to acoustic signal data in a discrete manner by using the same window function for first and second frames in respective sequential frames extracted from an acoustic signal so that those frames have a predetermined fixed time length, thus to carry out prediction of waveform on the assumption that, with respect to phase information every a predetermined of discrete frequencies determined as the result of the Fourier transform processing every the first and second frames, quantities of changes of phase information every discrete frequencies corresponding to each other in the first and second frames can be substantially fixed every respective discrete frequencies. It is to be noted that, e.g., a spectrum of a frame preceding by one may be used as it is for prediction of the amplitude.

Figure 10:
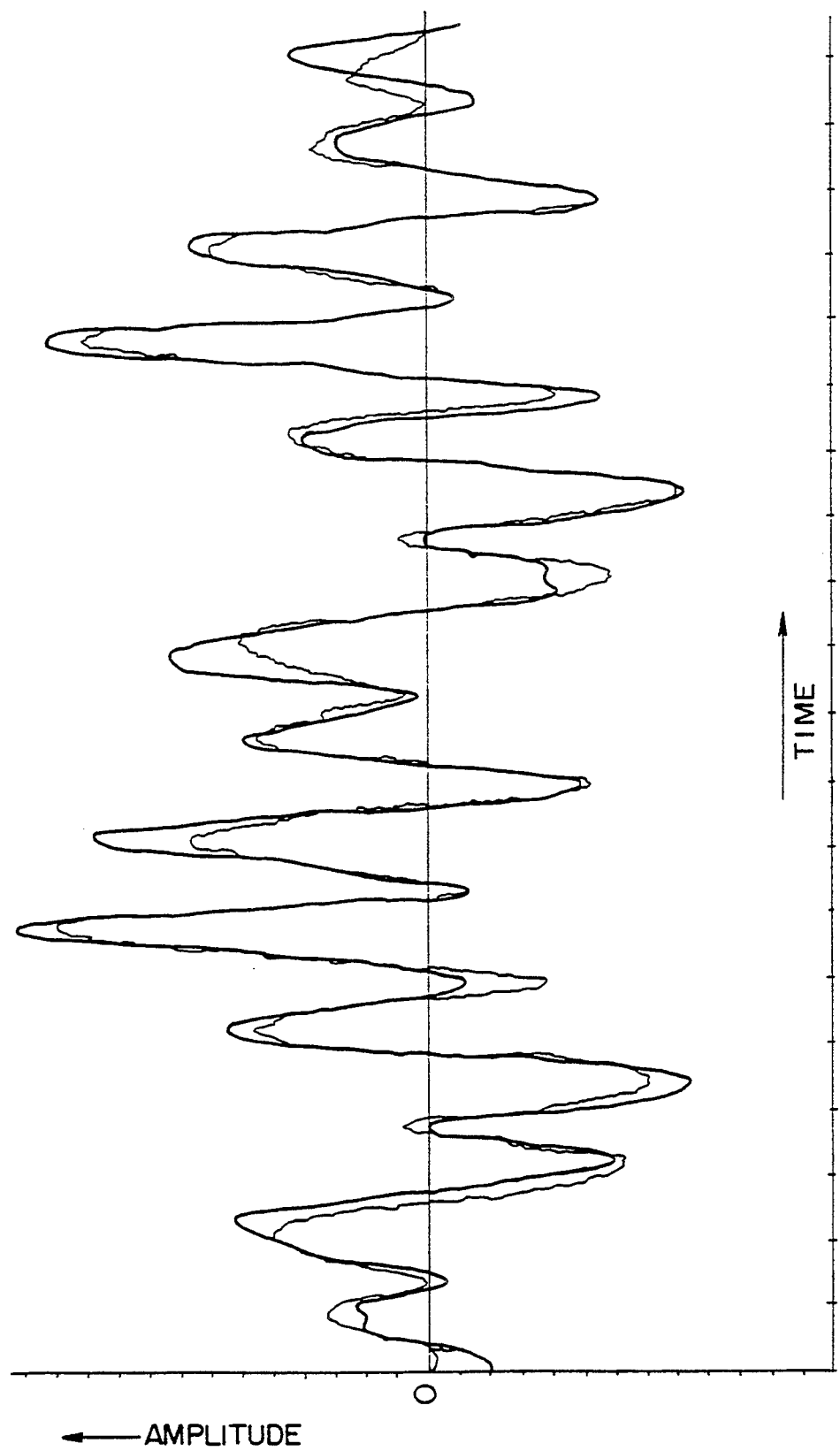
FIG. 10 is a waveform diagram of an acoustic signal of a piano.

The waveform of a predicted value of an acoustic signal of a piano indicated by the thick line in FIG. 10 is obtained by applying inverse Fourier transform processing prediction of phase is carried out by the waveform prediction method for an acoustic signal of this invention as previously described with respect to respective frames and prediction of the amplitude is carried out by using a spectrum preceding by one as a predicted value. On the other hand, the waveform indicated by the thin lines shows an acoustic signal of an actual piano. When the waveform of a predicted value of an acoustic signal of a piano shown in FIG. 10 and waveform of an acoustic signal of an actual piano are compared with each other, it is confirmed that extremely satisfactory prediction results may be obtained also with respect to general acoustic signals by the waveform prediction method of an acoustic signal of this invention constructed in accordance with the hypothesis by the inventors.

In accordance with the waveform prediction method for an acoustic signal of this invention constructed in accordance with the above-mentioned hypothesis, satisfactory prediction can be obtained with respect to any general acoustic signal as previously described. When the prediction technology for an acoustic signal carried out by applying thereto the waveform prediction method for an acoustic signal of this invention is applied, it is possible to construct, e.g., a sound source for an electronic instrument which is simpler in construction and more satisfactory in characteristics than the prior art, or to efficiently encode an acoustic signal to record or transmit such a coded signal. It is to be noted that while both predicted values with respect to amplitude prediction and phase prediction of an acoustic signal are required in the case of carrying out prediction of an acoustic signal, prediction of amplitude every respective discrete frequencies is considered to be conducted on the assumption that a present frame is the same as the amplitude in an earlier frame.

First, explanation will be given in the case of constructing a sound source for an electronic musical instrument which is simpler in construction and more satisfactory in characteristic than the prior art by applying thereto the prediction technology for an acoustic signal to which the waveform prediction method for an acoustic signal is applied. There have been put into practice electronic musical instruments of a structure in which a second produced from an acoustic musical instrument as a sound source for an electronic musical instrument is stored as a digital signal to prepare a musical instrument sound by using a sound of the electronic musical instrument stored in advance in playing of that musical instrument to output it from a speaker. In conventional electronic musical instruments thus constructed, a memory having a large memory capacity was required for storing many digital data.

However, in the case where a sound source for an electronic musical instrument is constructed by applying thereto the waveform prediction method for an acoustic signal of this invention constructed in accordance with the above-mentioned hypothesis, a reproduced sound more satisfactory than the prior art can be provided only by storing a small quantity of data.

In the case of compressing a quantity of information of a signal to be recorded or transmitted to record or transmit compressed information by applying this invention thereto, it is sufficient to record or transmit a residual signal "$U_n = A_n - A_{n-1}$" of amplitude and a residual signal "$V_n = \theta_n - (2\theta_{n-1} - \theta_{n-2})$" of phase every frame.

These residual signals $U_n$ and $V_n$ become equal to zero if the prediction is correct. However, since a small deviation from a predicted value ordinarily takes place, there is little possibility that the above-mentioned residual signals become equal to zero, but a quantity of information of each residual signal is far smaller than that of an original signal.

Figure 4:
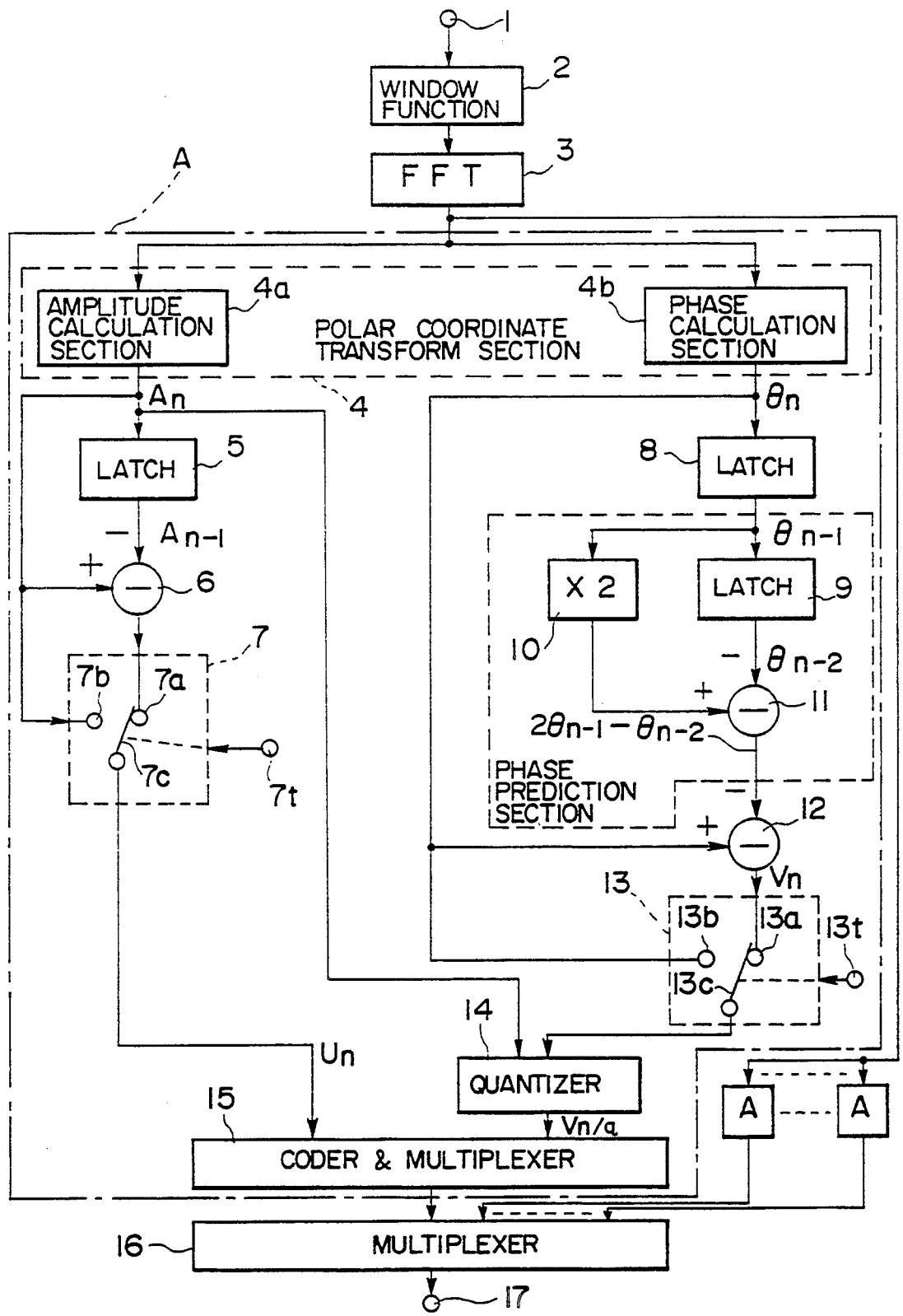
FIG. 4 is a block diagram showing a partial configuration on the side of the transmitting unit of a waveform prediction system for an acoustic signal according to an embodiment of this invention.
Figure 5:
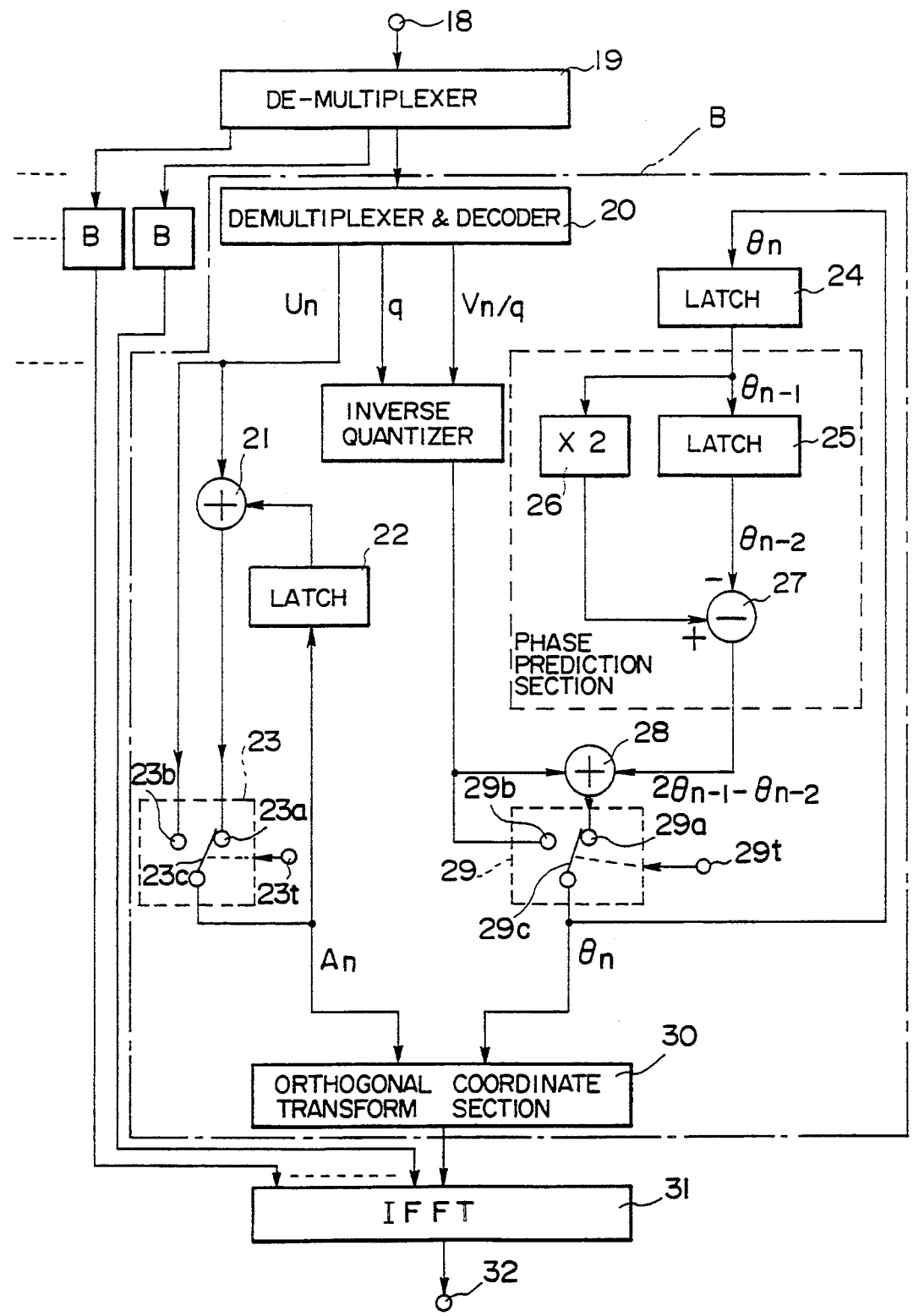
FIG. 5 is a block diagram showing a partial configuration on the side of the receiving unit of a waveform prediction system for an acoustic signal according to the embodiment of this invention.

FIG. 4 is a block diagram showing a partial configuration on the transmitting side or on the recording side in a transmission system or a recording/reproducing system, and FIG. 5 is a block diagram showing a partial configuration on the receiving side or the reproducing side in the transmission system or the recording/reproducing system. It is to be noted that even if the description given below is the description common to the transmission system or the recording/reproducing system, expression will be given merely by using the terms of transmission system, transmitting side, receiving side, and transmission, and the terms of recording/reproducing system, recording side, reproducing side, and recording/reproducing are not used.

In FIG. 4, numeral 1 denotes an input terminal to which a digital acoustic signal as a transmission object is inputted, 2 a window function multiplier which takes out sequential frames each having a predetermined time length, for example, having sampling points of N points by using a predetermined window function, and 3 a fast Fourier transform (FFT) calculator which calculates a FFT with respect to components of each frame to obtain data as a calculation result of the FFT, which is comprised of a real part and an imaginary part of each discrete frequency of N numbers and having a predetermined frequency interval f. Where, N denotes a sampling data number in each Fourier transform frame, fs is a sampled frequency, and f is obtained by "$f = fs/N$".

An N number of the discrete frequency data obtained by above, is each supplied to signal processing apparatus A which are provided with each discrete frequency. In FIG. 4, with respect to only one signal processing apparatus A for processing a signal data of a specific discrete frequency, a detailed configuration is shown in a frame A of a dot-and-dash line, and other signal processing apparatus are shown by solid line boxes A, . . . A.

In each signal processing apparatus, a polar coordinate transform section 4 transforms coordinates of the specific discrete frequency data to divide them into an amplitude part and a phase part. Namely, the real part amplitude and the imaginary part amplitude are supplied to an amplitude calculation section 4a and a phase calculation section 4b of the polar coordinate transform section 4. The amplitude calculation section 4a calculates an amplitude according to the formula (1), and the phase calculation section 4b calculates a phase according to the formula (2) to obtain a composite amplitude part and a phase part by a polar coordinate transform for each discrete frequency with respect to sequential frames.

The amplitude calculation section 4a obtains an amplitude $A_n$ of the specific discrete frequency as a calculation result. The amplitude $A_n$ is supplied to a latch 5, a subtracter 6, and a fixed contact 7b of a changeover switch 7, respectively. A movable contact 7c of the switch 7 is changed over between a fixed contact 7a and the fixed contact 7b according to a changeover control signal which is supplied to a supply terminal 7t for the changeover control signal. Since the movable contact 7c is configured to link with a movable contact 13c of a changeover switch 13 mentioned later, they are controlled by the same changeover control signals which are supplied to the supply terminals 7t and 13t.

The movable contacts 7c and 13c may originally contact to the fixed contacts 7b and 13b only during an interval of the initial frame. However, it is desired for a practical use that the contacts 7c and 13c are changed over to contact the contacts 7b and 13b every frame periods each having a proper time interval in addition to the initial frame period. The reason why the movable contacts 7c and 13c are changed over to contact the fixed contacts 7b and 13b, is to prevent erroneous operation by an accumulation of the prediction error.

The amplitude calculation section 4a obtains the amplitude $A_n$ of the specific discrete frequency (temporarily designated as fa) as a calculation result. Since the subtracter 6 obtaining data of the amplitude $A_n$ is supplied from the latch 5 data of an amplitude $A_{n-1}$ as a subtrahend signal (data of the calculation result of the amplitude of the specific discrete frequency fa in the frame of the n−1 order), the subtracter 6 outputs an amplitude residual signal $U_n$ to supply it to a coder and multiplexer 15 through the fixed contact 7a and movable contact 7c of the changeover switch 7. The latch 5 now holds data with respect to the amplitude $A_n$ which is outputted from the amplitude calculation section 4a of the polar coordinate transform section 4 as the calculation result of the specific discrete frequency amplitude during the n-th frame.

A phase $\theta_n$ of the specific discrete frequency obtained as the calculation result of the phase calculation section 4b, is supplied to a latch 8, a subtracter 12, and the fixed contact 13b of the changeover switch 13. Data of a phase $\theta_{n-1}$ which is latched before the latch 8 latches data of a phase $\theta_n$ of the specific discrete frequency (temporarily designated as fa) as a calculation result of the section 4b, is latched by a latch 9 of a phase prediction section. The phase prediction section is comprised of the latch 9, an amplifier 10 having a gain of 2, and a subtracter 11.

Data of a phase $\theta_{n-2}$ as the calculation result with respect of the specific discrete frequency in the "n−2"-th frame of the phase calculation section 4b, that is, the data of the phase held by the latch 9 before the hold of the data of the phase $\theta_{n-1}$, is supplied to the subtracter 11 as the subtrahend signal. Since the subtracter 11 obtains an output of the amplifier 10 as a minuend signal, the subtracter 11 of the phase prediction section outputs prediction phase data "$2\theta_{n-1}-\theta_{n-2}$".

A subtracter 12 subtracts the data "$2\theta_{n-1}-\theta_{n-2}$" from actual phase data $\theta_n$ to output a phase residual signal $V_n$ which is "$V_n=\theta_n-(2\theta_{n-1}-\theta_{n-2})$" and is supplied to a quantizer 14 through the fixed contact 13a and the movable contact 13c. The quantizer may be provided between the subtracter 11 and the changeover switch 13. The quantizer 14 also receives data of the amplitude $A_n$, and determines a quantization step size q in correspondence with the amplitude $A_n$ and the specific discrete frequency fa corresponding thereto. The reason why the above operation is performed, is to cause a variable length coding of a succeeding frame to be advantageous by allowing a quantization error of the residual signal, thereby reducing a residual data value in higher frequency band and lower amplitude $A_n$. The quantizer 14 quantizes the phase residual signal $V_n$ by the determined quantization step size q (namely, $V_n/q$ is calculated), to output a quantization phase residual signal $V_n/q$. Both the quantization step size q and the quantization phase residual signal $V_n/q$ are supplied to the coder and multiplexer 15.

In the coder and multiplexer 15, the amplitude prediction residual signal $U_n$, the quantization phase residual signal $V_n/q$ and the quantization step size q each of the specific discrete frequency fa are processed by the variable length coding (such as Huffman coding) and also multiplexed to supply a multiplexer 16 of the following stage.

Since the multiplexer 16 receives all of output data supplied from other signal processing circuit A, . . . , A each of which generates an amplitude residual signal $U_n$, quantization phase residual signal $V_n/q$ and quantization step size q of every other discrete frequency, the multiplexer 16 outputs data of acoustic signals having a compressed data amount, to transmit the data through an output terminal to a transmission line.

Next, there will be described one example configuration of a receiving side of the transmission system in accordance with FIG. 5. In FIG. 5, numeral 18 denotes an input terminal of the receiving side, and is supplied acoustic signal data of the compressed amount through the transmission line (not shown in the figure) which was described by using FIG. 4. The acoustic signal data of the compressed data amount is separated by a demultiplexer 19 into the amplitude residual signal $U_n$, the quantization phase residual signal $V_n/q$ and the quantization step size q every a predetermined discrete frequency, respectively, thereby supplying them each of signal processing apparatus B, . . . , B, which are provided for respectively processing the amplitude residual signal $U_n$, the quantization phase residual signal $V_n/q$ and the quantization step size q every respective specific discrete frequencies.

In FIG. 5, there is shown a detailed configuration of only one signal processing apparatus B in a dot-and-line border with respect to the specific discrete frequency, and other apparatus B, . . . , B for processing other specific discrete frequencies are shown by solid line boxes.

Each of the signal processing apparatus B, . . . , B comprises de-multiplexer and decoder 20 for separating the amplitude residual signal $U_n$, the quantization phase residual signal $V_n/q$ and a quantization step size q from the specific discrete frequency acoustic siganal data which is supplied from the de-multiplexer 19. The separated and decoded amplitude residual signal $U_n$ is supplied to a fixed contact 23b of a changeover switch 23 and an adder 21.

A movable contact 23c of the switch 23 is switched to the side of a fixed contact 23a during the initial frame period (with respect to each predetermined interval when the movable contacts 7c and 13c are switched to the fixed contacts 7a and 13a on the transmission side), while the contact 23c is switched to the contact 23b during other frame periods.

On the hand, a movable contact 29c is switched to a fixed contact 29a during initial two frame periods (with respect to each of predetermined interval when the movable contacts 7c and 13c are switched to the fixed contacts 7a and 13a on the transmission side), while the contact 29c is switched to the contact 29b during other frame periods.

In FIG. 5, when the amplitude residual signal $U_n$ of n-th frame is coincident with the amplitude residual signal $U_n$ supplied from the de-multiplexer and decoder 20 to the adder 21, the adder 21 adds data $A_{n-1}$ of synthetic amplitude term of (n−1)-th frame with the amplitude residual signal $U_n$ of n-th frame thus to output data $A_n$ of the synthetic amplitude term (Amp) of n-th, thereby holding it by a latch 22 and supplying it to an orthogonal coordinate transform section 30.

Furthermore, the de-multiplexer and decoder 20 also divides and decodes the specific discrete frequency quantization phase residual signal $V_n/q$. The signal $V_n/q$ and the quantization step size q are supplied to an inverse quantizer 33 which multiplies the signal $V_n/q$ by the size q to generate the phase residual signal $V_n$ to supply it to the adder 28 and the changeover switch 29.

The latch 24 holds the phase data $\theta_{n-1}$ of the specific discrete frequency fa in (n−1)-th frame before holding the phase data $\theta_n$. When the latch 24 holds an output $\theta_n$ of the switch 29, the latch 24 outputs the previous output $\theta_{n-1}$.

In the phase prediction section, the latch 25 latches the data $\theta_{n-1}$ previous to the data $\theta_n$ to output the data $\theta_{n-2}$, the multiplier 26 multiplies the data $\theta_{n-1}$ by 2, and the subtracter 27 subtracts the data $\theta_{n-2}$ from the data $2\theta_{n-1}$. Accordingly, the phase prediction section outputs "$2\theta_{n-1}-\theta_{n-2}$".

The adder 28 adds the phase residual signal $V_n$ {of n-th frame, namely, $V_n=\theta_n-(2\theta_{n-1}-\theta_{n-2})$} from the inverse quantizer 33 with an input "$2\theta_{n-1}-\theta_{n-2}$" of the adder 27, thereby outputting data $\theta_n$ of the phase term (Phase) of the specific discrete frequency fa in n-th frame.

As described above, the data $A_n$ of the synthetic amplitude term (Amp) of the n-th frame from the adder 21 and the data $\theta_n$ of the phase term (Phase) of the specific discrete frequency of the n-th frame from the adder 28, are supplied to the orthogonal coordinate transform section 30. The transform section 30 calculates the real part (Real) and imaginary part (Imag) of the specific discrete frequency fa, on the basis of the data $A_n$ and data $\theta_n$ of the n-th frame to output it to an inverse FFT calculation section 31.

Since the section 31 obtains all of the output data from all signal processing apparatus B, . . . , B which are individually provided every specific discrete frequencies, the section 31 restores the acoustic signal data to its original state to output it.

While explanation has been given in the case where such a calculation of phase information is performed by a difference of one frame to predict phase information of the n-th frame by using phase information of the (n−2)-th frame and phase information of the (n−1)-th frame, it is a matter of course that calculation of phase information may be performed by a difference of several frames in carrying out prediction. Namely, since the waveform prediction method for an acoustic signal of this invention is based on the concept entirely different from the concept of FFT that the same waveform is assumed to continue over all frames irrespective of the time position of frame, if an interval between two frames used for prediction is known and the relationship of a frame to be predicted relative to a reference (in actual terms, a later frame of the above-mentioned two frames) is a multiple of integer of one frame, prediction may be carried out by using any interval. Furthermore, the configurations on the transmitting side and on the receiving side are not limited to those shown in FIGS. 4 and 5. In embodying the invention as an apparatus, it is preferably that the apparatus can be constructed in a suitably modified form so that an error in the digital signal processing is small and its cost is low. In addition, it is ordinary to employ a configuration such that the circuit on the transmitting side is constructed with a low cost circuit so that errors on the transmitting side and on the receiving side are canceled with each other, and the circuit on the transmitting side is caused to be operative as a local decoder on the receiving side to obtain a residual signal. It is to be noted that the method of this invention may be carried out by a microprocessor, etc.

In the case where this invention is applied to an actual transmission, an approach may be employed to reduce a quantity of data transmitted while further increasing the degree of prediction by this invention. Explanation will now be given by using actual example.

1. Method of allowing the frame length to be a value in correspondence with frequency:

In the above-described examples of configuration, FFT operation is performed so that the number of samples is fixed irrespective of a signal frequency. Meanwhile, in the waveform prediction method for an acoustic signal of this invention, a prediction error is large in a signal of a low frequency band such that only two or three waves exist in the frame, and a prediction error is also large in a signal of a high frequency band such that 30–50 waves exist in the frame.

The problem at a low frequency band is considered to be based on the mathematic processing of FFT. Furthermore, the problem at a high frequency band is considered to result from the fact that a coherency (phase discontinuity) of sound existing in the natural world is insufficient. Anyway, this resultant implies that it is preferably to allow the frame length to be a value in correspondence with a frequency of signal.

Figure 6A:
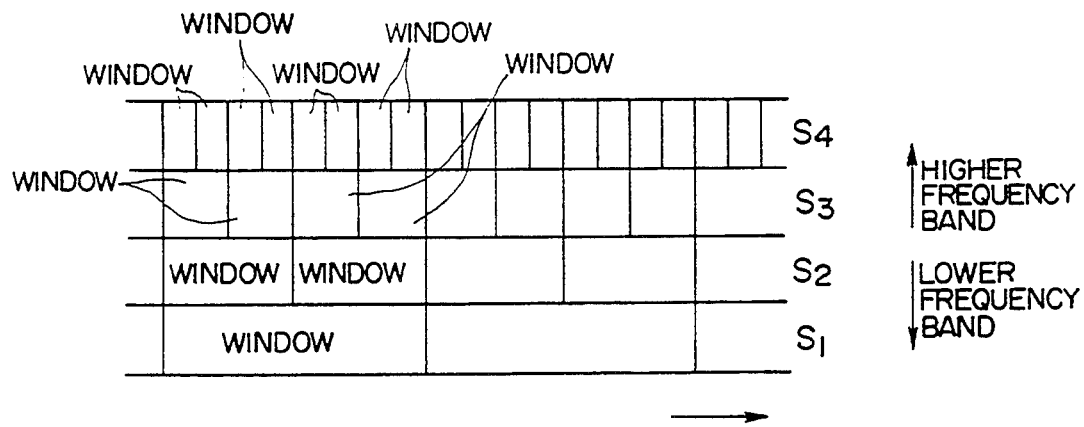
FIGS. 6(a) and 6(b) are block diagrams showing a partial configuration on the side of the transmitting unit in the case where band division of signal is carried out.
Figure 6B:
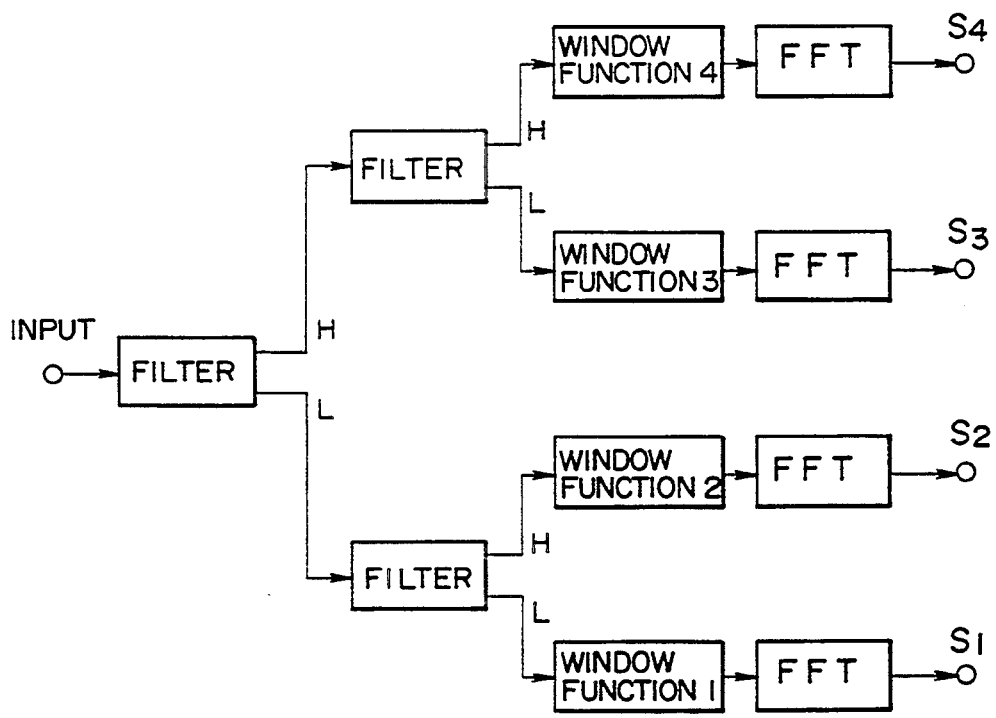

In view of this, in carrying out the waveform prediction method for an acoustic signal of this invention, it is preferable to employ an approach to divide an acoustic signal into a plurality of frequency bands of low, medium and high frequency bands to allow the frame length to be different every respective frequency bands to allow the number of waves handled in all frames to be substantially fixed. FIG. 6 is an explanatory view in the case where the frequency band of an acoustic signal is divided into a plurality of frequency bands. FIG. 6(a) shows the concept of the window length wherein according as the frequency band shifts to a lower frequency side, the window length becomes shorter. FIG. 6(b) shows an example where the frequency band is divided by using a filter to apply window functions different from each other every signal components in the respective divided frequency bands. Namely, FIG. 6(b) shows the example where a high-pass filter and a low-pass filter are used as a filter to divide the frequency band. "H" in the figure indicates an output from the high-pass filter, and "L" in the figure indicates an output from the low-pass filter.

In FIG. 6(a), the example where the window length is set to a value of multiple of the original length, a value of multiple thereof . . . However, the window length may be arbitrarily set. Furthermore, in dividing the frequency band, it is unnecessary to cascade-connect filters as shown. Band division may be carried out by using a band-pass filter. Furthermore, a filter such as QMF (Quadrature Mirror Filter) may be used to change the number of samples at the same time of the filter operation. Alternatively, the number of samples may be varied (decimation may be carried out) after a signal is passed through an orthogonal filter.

After respective signal components in different frequency bands are respectively multiplied by different functions, FFT operation is carried out. The signal processing subsequent to the FFT operation is as shown in FIG. 4.

2. Method of allowing the prediction accuracy of phase to be varied depending upon frequency and amplitude:

As previously described above, it is unnecessary to transmit a prediction residual signal with the same accuracy with respect to all discrete frequencies.

Namely, an employment of a method of varying the accuracy rather results in improvement in the efficiency as a whole.

Especially, it is necessary to transmit a more precise phase according as the frequency band shifts to a lower frequency side with respect to the phase prediction residual signal, and the phase accuracy is required to less degree according as the frequency band shifts to a higher frequency side.

If the phase prediction residual signal fails to be transmitted although the prediction is wrong, the following problem occurs. Namely, (A) sound of a repetition frequency of frame is heard like noise. (B) The sound image localization (lateralization) of stereo is not determined, so it becomes out of order.

The problem (A) is considered as follows. Namely, in the case where the phase becomes out of order, continuity of waveform at the connecting portions between sequential frames is lost, resulting in noise. On the other hand, the problem (B) is considered as follows. Namely, in the case of the stereo sound, stereoscopic feeling is exhibited by using a sound pressure difference and a phase difference between two sound waves radiated from spaced two speakers. Accordingly, if the phase becomes out of order, the sound image also becomes out of order.

When consideration is made as to accuracy of phase from the above-mentioned point of view, it is seen that the accuracy of phase is no more than the accuracy of time. For example, an antiphase (half-wave length=180 degree) at the upper limit frequency value 20 KHz of an audible frequency of the human being corresponds to 25 micro seconds in terms of 18 degrees at the frequency value of 2 KHz, a phase of 1.8 degrees at the frequency value of 200 Hz, and a phase of 0.18 degrees at the frequency value of 20 Hz with respect to the above-mentioned time value.

Accordingly, even if a signal having a frequency of 10–20 KHz is transmitted with the phase accuracy thereof being one bit (only positive phase and antiphase), two bits are required for transmission of a signal having a frequency of 5–10 KHz. Furthermore, about 10 bits are required for transmission of a signal having the frequency value of 20–40 Hz in the lowest frequency band. As readily from the above-mentioned example, it is a preferred embodiment of this invention that a larger number of bits are allocated for the phase residual transmission according as the frequency band shifts to a lower frequency side. This is substantially in correspondence with the hearing sense characteristic of the human being.

Furthermore, since a larger phase prediction error value is permissible in the case of a smaller amplitude, control of the quantization step size q is actually carried out in such a manner that the amplitude value $A_n$ is included in addition to the discrete frequency value.

In addition, the amplitude can be considered to be as a relative value. Accordingly, it is desirable from a practical point of view to control the quantization step q of a phase prediction error signal with respect to discrete frequencies by the rations of the amplitudes $A_n$ of respective frequencies to the total amplitude AT of all spectra, i.e., $A_n/AT$. This quantization step size processing is carried in the quantizer 14 of FIG. 4, but may be in any other section of the apparatus. For example, in the case of carrying out only phase prediction without determining a phase residual signal (in the case of the previously described sound source), the processing section for the quantization step size may be provided in the phase prediction section.

What is claimed is:

1. A waveform prediction system for predicting a phase of an acoustic signal, comprising:

frame extracting means for sequentially extracting frames of the acoustic signal comprising sequential portions of the acoustic signal, each frame having a predetermined time duration, said frame extracting means extracting first and second sequential frames each having a first predetermined time duration at first and second instants of time, respectively;

first detection means connected to said frame extracting means for detecting a signal waveform of a first frame at said first instant of time;

second detection means connected to said frame extracting means for detecting a signal waveform of a second frame at said second instant of time;

orthogonal transform means for orthogonally transforming acoustic signal data in the first and second frames using a same window function for said first and second frames and generating data representative thereof;

conversion means for converting data with respect to a predetermined number of discrete frequencies of the data obtained from said orthogonal transform means into amplitude data and phase data;

determination means for determining for each discrete frequency, quantities of change of the phase data in said first and second frames;

phase prediction means for predicting phase data for each discrete frequency in said third frame such that quantities of phase data for said discrete frequencies are constant with respect to time, said third frame being a frame at a third instant of time which is subsequent to said second instant of time by an integer multiple of the difference between the first and second instants of time;

amplitude conversion means for converting amplitude data predicted on the basis of the amplitude data of said second frame and predicted phase data of said third frame to complex number data for each discrete frequency by coordinate transformation; and inverse orthogonal transform means for implementing inverse orthogonal transform processing to said complex number data such that the data obtained is signal waveform data of said third frame.

2. The waveform prediction system for an acoustic signal as set forth in claim 1, wherein:

said first detection means detects an acoustic signal of an (n−2)-th frame as said first frame;

said second detection means detects an acoustic signal of an (n−1)-th frame as said second frame;

said third detection means detects an acoustic signal of an n-th frame as said third frame; and said phase prediction means predicts phase $\theta_n$ of said specific discrete frequency in the n-th frame on the basis of an expression of $\theta_n = 2\theta_{n-1} - \theta_{n-2}$, where a phase of a specific discrete frequency in the (n−1)-th frame is $\theta_{n-1}$, and a phase of said specific discrete frequency in the (n−2)-th frame is $\theta_{n-2}$.

3. A method of predicting a waveform of an acoustic signal in a third frame which is extracted from a sequence of first, second and third frames in the manner of having predetermined same time length as the basis of a signal waveform of the first frame at a first time position, a signal waveform of the second frame at a second time position having a time difference from said first time position, and a signal waveform of the third frame having a third time position distant from said second time position with positive number times of said time difference between said first and second time position; said method comprising:

a) a step of issuing output signals which are Fourier transformed versions of waveforms of said first and second frames;

b) a step of converting specified discrete frequencies of said output signals obtained in the step a) into signals respectively representing an amplitude signal and a phase signal;

c) a step of detecting changes in the phase of said first and second frames at each of said discrete frequencies;

d) a step of predicting and outputting a phase signal at each of said discrete frequencies in said third frame on the basis of said changes such that the phase signal at each of the discrete frequencies is constant with respect to time;

e) a step of predicting and outputting an amplitude signal at each of said discrete frequencies in said third frame on the basis of said amplitude signal in said second frame;

f) a step of performing a coordinate transform at each of said discrete frequencies with respect to said phase signal and said amplitude signal in said third frame each predicted in the steps d) and e); and g) a step of outputting a predicted waveform of said third frame after performing an inverse Fourier transform with respect to a signal obtained in the step f).

4. The method according to claim 3, wherein:

the step d) comprises a step in which a phase $\theta_n$ of a specific frequency in an n-th frame is predicted and obtained by an expression of "$\theta_n = 2\theta_{n-1} - \theta_{n-2}$", where $\theta_{n-1}$ is a phase of a specific frequency of an (n−1)-th frame and $\theta_{n-2}$ is a phase of a specific frequency of an (n−2)-th frame.

5. A system for predicting the phase of an acoustic signal comprising:

means for extracting a series of frames of an acoustic signal, each frame comprised of a predetermined time duration of the acoustic signal, said frames partially overlapping each other in time;

means for orthogonally transforming every frame and generating orthogonally transformed complex data;

polar coordinate transform means for converting data with respect to a predetermined number of discrete frequencies of the orthogonally transformed complex data into amplitude data and phase data;

means for obtaining an amplitude difference signal indicating a difference between amplitude data of a present frame and amplitude data of a previous frame for each of the predetermined number of discrete frequencies;

phase prediction means for determining a quantity of change of phase data for each discrete frequency between two preceding frames to predict phase data for each discrete frequency of the present frame on the basis of the quantity of change;

means for obtaining a phase prediction error signal indicating a difference between phase data at each discrete frequency of the present frame from said polar coordinate transform means and predicted phase data for each discrete frequency of the present frame from said phase prediction means;

a quantizer for quantizing said phase prediction error signal;

a code/multiplexer for coding, for each discrete frequency, said amplitude difference signal and said quantized phase prediction error signal and multiplexing them to generate a multiplexed signal; and a multiplexer for further multiplexing the multiplexed signal over the predetermined number of discrete frequencies.

6. The system of claim 5, wherein the means for extracting generates said series of frames such that a first and second frame begin at first and second instants of time, and a third frame begins at a third instant of time which is subsequent to the second instant of time by an integer multiple of the difference between the first and second instants of time.

* * * * *